United States Patent Office.

OLE CHRISTIAN GREEN, OF COPENHAGEN, DENMARK.

Letters Patent No. 91,114, dated June 8, 1869.

IMPROVED COMPOUND FOR MAKING FRICTION-MATCHES.

The Schedule referred to in these Letters Patent and making part of the same.

*To all whom it may concern:*

Be it known that I, OLE CHRISTIAN GREEN, of the city of Copenhagen, in the Kingdom of Denmark, have invented a new and useful Improvement in Match-Compounds; and I do hereby declare the following to be a full, clear, and exact description of the same.

My invention consists in the preparation of a match-compound without employing phosphorus, and not necessitating a prepared friction surface in order to obtain an instant light.

To enable others skilled in the art to make and use my improvement, I will proceed to describe its mode of operation.

The match-compound consists of about twelve parts of hyposulphate of lead; eight parts chromate of iron v. sulphate of baryta; two parts sulphur.

This composition is well mixed, and then is added a solution consisting of twenty-one parts of chlorate of potassa (pulverized,) four parts of gluten, and eight parts of water.

In the above compound I may also employ six parts of chromate of lead, but when this substance is not employed, I may dye the compound with any aniline color.

If desired, I may furnish the compound with a coat consisting of a solution of alcohol, gum, rosin, or other adhesive substance.

The sticks may be made of wood, or any suitable material, and saturated or coated with paraffine, stearine, or any other suitable substance.

What I claim, and desire to secure by Letters Patent, is—

The compound formed of the ingredients herein described, substantially as and for the purpose set forth.

OLE CHRISTIAN GREEN.

Witnesses:
H. CHR. HAMMERICH,
M. BÖTTZAUER.